US009171479B2

(12) United States Patent
Martin et al.

(10) Patent No.: US 9,171,479 B2
(45) Date of Patent: Oct. 27, 2015

(54) TRAINING SYSTEM OF A POWERED VEHICLE

(75) Inventors: Glenn Neil Martin, Christchurch (NZ); Vanessa Louise Martin, Christchurch (NZ)

(73) Assignee: Martin Aircraft Company Limited, Christchurch (NZ)

( * ) Notice: Subject to any disclaimer, the term of this patent is extended or adjusted under 35 U.S.C. 154(b) by 558 days.

(21) Appl. No.: 13/383,833

(22) PCT Filed: Jul. 15, 2010

(86) PCT No.: PCT/IB2010/053220
§ 371 (c)(1),
(2), (4) Date: Jan. 12, 2012

(87) PCT Pub. No.: WO2011/010249
PCT Pub. Date: Jan. 27, 2011

(65) Prior Publication Data
US 2012/0107776 A1 May 3, 2012

(30) Foreign Application Priority Data

Jul. 20, 2009 (NZ) ........................................ 578511

(51) Int. Cl.
*G09B 19/16* (2006.01)
*G09B 9/042* (2006.01)
(Continued)

(52) U.S. Cl.
CPC *G09B 9/042* (2013.01); *G09B 9/02* (2013.01); *G09B 9/048* (2013.01); *G09B 9/052* (2013.01); *G09B 9/08* (2013.01); *G09B 19/165* (2013.01); *G09B 19/167* (2013.01)

(58) Field of Classification Search
CPC ...................................................... G09B 19/16
USPC .................. 244/118.6; 434/33, 35, 62; 356/2; 290/40 R; 701/2; 702/141
See application file for complete search history.

(56) References Cited

U.S. PATENT DOCUMENTS 2,417,896 A 3/1947 Zimmerman
2,461,347 A 2/1949 Pentecost
(Continued)

FOREIGN PATENT DOCUMENTS

DE 2021043 11/1971
DE 2552888 6/1977
(Continued)

OTHER PUBLICATIONS

PCT International Search Report dated Apr. 11, 2006 for PCT Application PCT/NZ2006/000029.
(Continued)

*Primary Examiner* — Xuan Thai
*Assistant Examiner* — Robert P Bullington
(74) *Attorney, Agent, or Firm* — Christie, Parker & Hale, LLP

(57) ABSTRACT

A training system for the solo operation of a powered vehicle, wherein the system includes: —providing means for electronic control of the speed and orientation of a ground vehicle or of the speed, orientation and height of a flying vehicle; —providing a virtual enclosure training area delineated by a plurality of spaced sensors; —providing means associated with said vehicle for communicating with, and receiving instructions from, each of said sensors; —whereby instructions received from said sensors may be used to control said means for electronic control such that movement of said vehicle is restricted to said virtual enclosure training area, and within said virtual enclosure training area, the speed and orientation of a ground vehicle or the speed, orientation and height of a flying vehicle controlled within preset parameters.

25 Claims, 10 Drawing Sheets

(51) Int. Cl.
*G09B 9/052* (2006.01)
*G09B 9/02* (2006.01)
*G09B 9/048* (2006.01)
*G09B 9/08* (2006.01)

(56) References Cited

U.S. PATENT DOCUMENTS

| | | | |
|---|---|---|---|
| 2,955,780 | A | 10/1960 | Hulbert |
| 3,023,980 | A | 3/1962 | Martin et al. |
| 3,063,655 | A | 11/1962 | Skavinsky |
| 3,149,799 | A | 9/1964 | Hulbert |
| 3,173,629 | A | 3/1965 | Uhor |
| 3,184,183 | A | 5/1965 | Piasecki |
| 3,265,329 | A | 8/1966 | Postelson |
| 3,474,987 | A | 10/1969 | Meditz |
| 3,494,575 | A | 2/1970 | Budworth |
| 3,556,438 | A | 1/1971 | Meditz |
| 3,994,453 | A * | 11/1976 | Firestone .................. 244/118.6 |
| 4,272,041 | A | 6/1981 | Mabuchi et al. |
| 4,379,532 | A | 4/1983 | Dmitrowsky |
| 4,575,341 | A * | 3/1986 | Bryant et al. .................. 434/35 |
| 5,104,217 | A * | 4/1992 | Pleitner et al. .................. 356/2 |
| 5,505,407 | A | 4/1996 | Chiappetta |
| 6,293,492 | B1 | 9/2001 | Yanagisawa |
| 6,353,789 | B1 | 3/2002 | Hanson |
| 6,464,166 | B1 | 10/2002 | Yoeli |
| 6,488,232 | B2 | 12/2002 | Moshier |
| 6,488,504 | B1 * | 12/2002 | Patterson .................. 434/33 |
| 6,708,920 | B2 | 3/2004 | Fukuyama |
| 6,817,570 | B2 | 11/2004 | Yoeli |
| 6,824,095 | B2 | 11/2004 | Mao |
| 6,848,649 | B2 | 2/2005 | Churchman |
| 6,854,686 | B2 | 2/2005 | Perlo et al. |
| 7,188,803 | B2 | 3/2007 | Ishiba |
| 2002/0104919 | A1 | 8/2002 | Geranio et al. |
| 2002/0104921 | A1 | 8/2002 | Louvel |
| 2002/0113165 | A1 * | 8/2002 | Moshier .................. 244/4 A |
| 2002/0155415 | A1 | 10/2002 | Carr |
| 2003/0036823 | A1 | 2/2003 | Mahvi |
| 2005/0178879 | A1 | 8/2005 | Mao |
| 2006/0057544 | A1 * | 3/2006 | Bond .................. 434/62 |
| 2006/0192047 | A1 | 8/2006 | Goossen |
| 2006/0196991 | A1 | 9/2006 | Martin |
| 2007/0282564 | A1 * | 12/2007 | Sprague et al. .................. 702/141 |
| 2007/0288127 | A1 * | 12/2007 | Haq et al. .................. 701/2 |
| 2008/0054647 | A1 * | 3/2008 | Kumar .................. 290/40 R |
| 2008/0150765 | A1 | 6/2008 | Nakajima |
| 2009/0081923 | A1 * | 3/2009 | Dooley et al. .................. 446/456 |

FOREIGN PATENT DOCUMENTS

| | | |
|---|---|---|
| DE | 4302791 | 8/1994 |
| FR | 2667568 | 4/1992 |
| GB | 268279 | 7/1926 |
| GB | 900095 | 7/1962 |
| RU | 2135393 C | 8/1999 |
| WO | WO 00/35751 A | 6/2000 |
| WO | WO 02/47978 A2 | 6/2002 |
| WO | WO 2006/093420 A1 | 9/2006 |

OTHER PUBLICATIONS

International Preliminary Report on Patentability, dated May 3, 2010, issued in PCT/NZ2009/000075, 9 pages.
International Search Report, dated Aug. 19, 2009, issued in PCT/NZ2009/000075, 4 pages.
Pike, John, H-21 Shawnee, Global Security.org, Aug. 15, 2004, http://web.archive.org/web/20040815133402/http://www.globalsecurity.org/military/systems/aircraft/h-21.htm, 2 pages.
Van Aken, Scott, Fonderie Miniature, 1/48 Piasecki H-21, Aug. 4, 2004, Modelingmadness.com, http://web.archive.org/web/20040804093536/http://www.modelingmadness.com/scotts/korean/fmh21preview.htm, 3 pages.
US Army, Shawnees Over South Vietnam 1962, 1962, Available at Wikipedia.org., http://upload.wikimedia.org/wikipedia/en/0/03/Shawnees_over_south_vietnam_1962.gif, 1 page.
CH-47 Chinook, Wikipedia, edited Oct. 13, 2004, http://en.wikipedia.org/w/index.php?title=CH-47_Chinook&oldid=7080365, 3 pages.
Roddenberry, Gene; USS Enterprise NCC-1701-D captain's chair, Star Trek: The Next Generation, aired 1987-1994, Paramount Television, Image available at Star Trek Wiki, http://memory-alpha.org/en/wiki/image:enterprisedcommandchair.jpg, 1 page.
Supplementary European Search Report mailed May 11, 2015, for Application No. 10802017.3, 6 Pages.

* cited by examiner

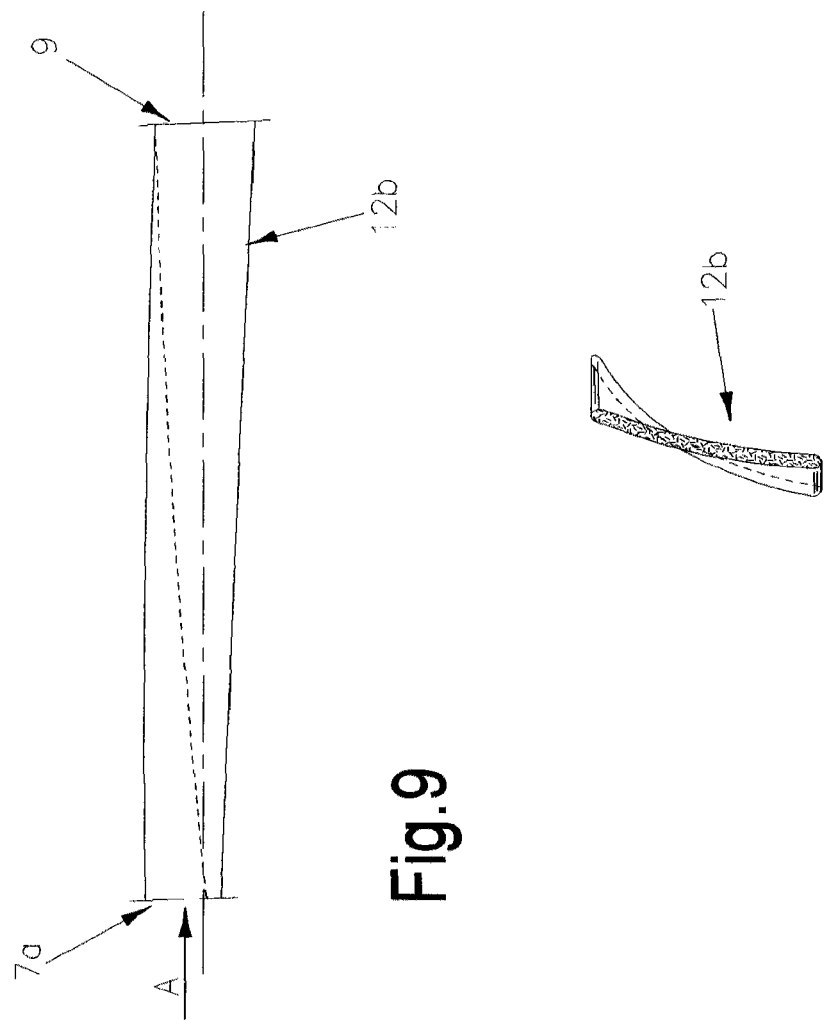

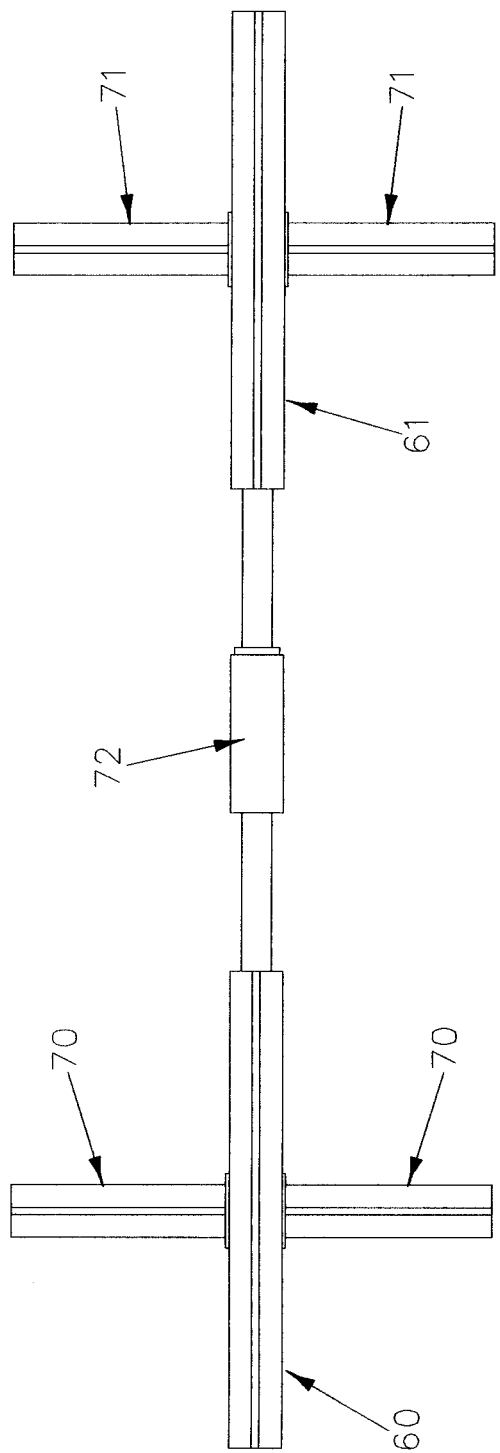

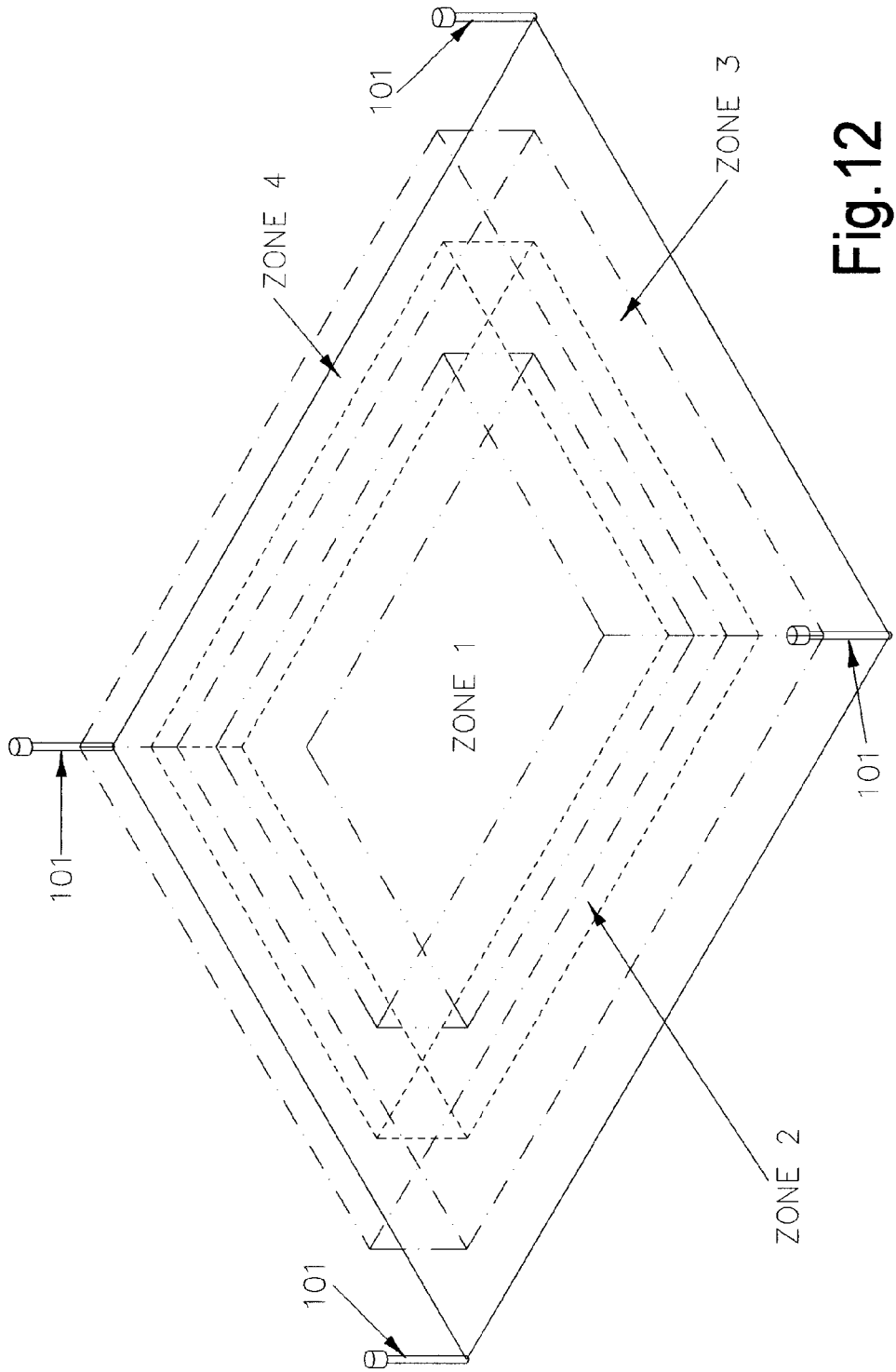

TRAINING SYSTEM OF A POWERED VEHICLE

CROSS-REFERENCE TO RELATED APPLICATION(S)

This application is a National Phase patent application and claims the priority of International Application Number PCT/IB2010/053220, filed on Jul. 15, 2010, which claims priority to and the benefit of New Zealand Patent Application Number 578511, filed on Jul. 20, 2009.

TECHNICAL FIELD

The present invention relates to a training system, and to apparatus for implementing that system, for training the user of any powered vehicle which has controls capable of being remotely controlled. As used herein, the term "training" includes any use by a new or an inexperienced user, whether the intention is the full training of the user, or simply to provide safe use conditions for use for amusement or sports purposes. The system and apparatus of the present invention have been developed especially for training users of the personal flight device described in New Zealand Patents Number 538630, 569454 and 569455, popularly known under the trademark "Martin Jetpack", and will therefore be described with particular reference to that application. However, it will be appreciated that the system and apparatus of the present invention could also be used for a wide variety of other powered vehicles.

BACKGROUND ART

The Martin Jetpack presents particular problems in the training of pilots, in that it is a solo vehicle and cannot readily be adapted as a dual trainer vehicle.

The Martin Jetpack is shown in FIG. 1 of the drawings, and consists of a pair of spaced ducted fan assemblies connected to a central housing which supports an engine and a radiator and also provides protection for the pilot, who is strapped to a harness mounted on the housing. The Jetpack controls are mounted on armrests secured one to each side of the housing.

Hitherto, pilots have been trained to use a Martin Jetpack by a number of different methods, using one or more of: overhead wires to restrain and guide the Jetpack; tethers; learning trolleys which support and limit the scope of movement of the Jetpack; and training assistants who physically restrain and guide the Jetpack. The most effective training aid has been found to be the training assistants, since they can limit the range of movement of the Jetpack but still allow the pilot sufficient feedback to learn to fly, and of course are capable of varying the degree of help they give as the pilot gains confidence and competence. However, a physical assistance of this type is very labour intensive and also is very tiring for the persons providing the assistance.

DISCLOSURE OF INVENTION

An object of the present invention is the provision of a training system, and apparatus for implementing that system, which permits a trainee to operate a vehicle solo and to have a wide degree of choice in the operation of that vehicle, but which nevertheless restricts or prevents unsafe operation.

The present invention provides a training system for the solo operation of a powered vehicle, wherein the system includes:

providing means for electronic control of the speed and orientation of a ground vehicle or of the speed, orientation and height of a flying vehicle;

providing a virtual enclosure training area delineated by a plurality of spaced sensors;

providing means associated with said vehicle for communicating with, and receiving instructions from, each of said sensors, whereby instructions received from said sensors may be used to control said means for electronic control such that movement of the said vehicle is restricted to said virtual enclosure training area, and within said virtual enclosure training area the speed and orientation of a ground vehicle or the speed, orientation and height of a flying vehicle are controlled within preset parameters.

Preferably, each sensor is adapted to sense both the position and the rate of change of position of said vehicle.

Preferably, said virtual enclosure training area provides two or more zones and said preset parameters are different for different zones.

Preferably, said virtual enclosure training area provides at least three zones arranged in a concentric pattern with the inner zone providing the preferred training area and the outer zones providing safety areas.

The virtual enclosure training area may be indoors or outdoors.

Preferably, said means associated with said vehicle for communicating with, and receiving instructions from, each of said sensors, includes an onboard computer which is programmed to control said means for electronic control of the vehicle. Preferably in use said programme includes default settings which are designed to bring the vehicle to a safe position in the event of any malfunction or control error.

Preferably, each sensor is a locator beacon and preferably also each locator beacon is designed to use ultra wideband radio-frequency technology in combination with a bi-directional control/telemetry channel to monitor both the position and the rate of change of position, relative to the beacon, of a tag adapted to be secured to the vehicle whose position and speed are to be monitored, said tag being arranged in use to emit a series of ultra wideband radio pulses at time intervals controlled by the control radio channel.

If the vehicle is a ground vehicle, then preferably the means for the electronic control of the orientation of said vehicle includes a gyroscope.

If the vehicle is a flying vehicle, preferably the means for electronic control of the orientation of said vehicle includes an attitude sensor.

The present invention further provides apparatus for implementing the above described system, wherein said apparatus includes:

means for electronic control of the speed and orientation of a ground vehicle or of the speed, orientation and height of a flying vehicle;

a plurality of spaced sensors arranged to delineate a virtual enclosure training area;

means associated with said vehicle for communicating with, and receiving instructions from, each of said sensors.

Preferably, said means associated with said vehicle for communicating with, and receiving instructions from, each of said sensors, includes an onboard computer which is programmed to control said means for electronic control of the vehicle.

Preferably, each sensor provides a wireless 3-D location system and is selected from the group consisting of: a GPS beacon, a radio-frequency identification sensor, an ultrasonic sensor, a radar beacon, an ultra wideband sensor. Most preferably, each sensor is a locator beacon which is designed to use ultra wideband radio frequency technology in combination with a bi-directional control/telemetry channel to monitor both the position and rate of change of position, relative to the beacon, of a tag adapted to be secured to the vehicle whose position and speed are to be monitored, said tag being arranged in use to emit a series of ultra wideband radio pulses at time intervals controlled by the control radio channel.

One embodiment of the present invention provides the combination of a Martin Jetpack and apparatus for implementing the above described system, in which the apparatus includes a plurality of spaced sensors arranged to delineate a virtual enclosure training area, and the Martin Jetpack is provided with:— controls for controlling the pitch, roll, yaw, and throttle of said jetpack, said controls being manually controllable by the pilot of the jetpack and also being electronically controllable by an onboard computer;

means for communicating with, and receiving instructions from, each of said sensors;

an attitude sensor capable of measuring pitch, roll, and yaw, said attitude sensor being connected to the onboard computer.

BRIEF DESCRIPTION OF THE DRAWINGS

By way of example only, a preferred embodiment of the present invention as applied to a "Martin Jetpack" is described in detail with reference to the accompanying drawings in which:—

FIG. 9 is a plan view of a stator of FIG. 8b on a larger scale;

FIG. 10 is a view in the direction of Arrow A of FIG. 9;

FIG. 11 is a plan view from above of one set of pitch/roll controls; and

FIG. 12 is a diagrammatic perspective view of the "virtual enclosure" training area.

BEST MODE FOR CARRYING OUT THE INVENTION

Figure 1:
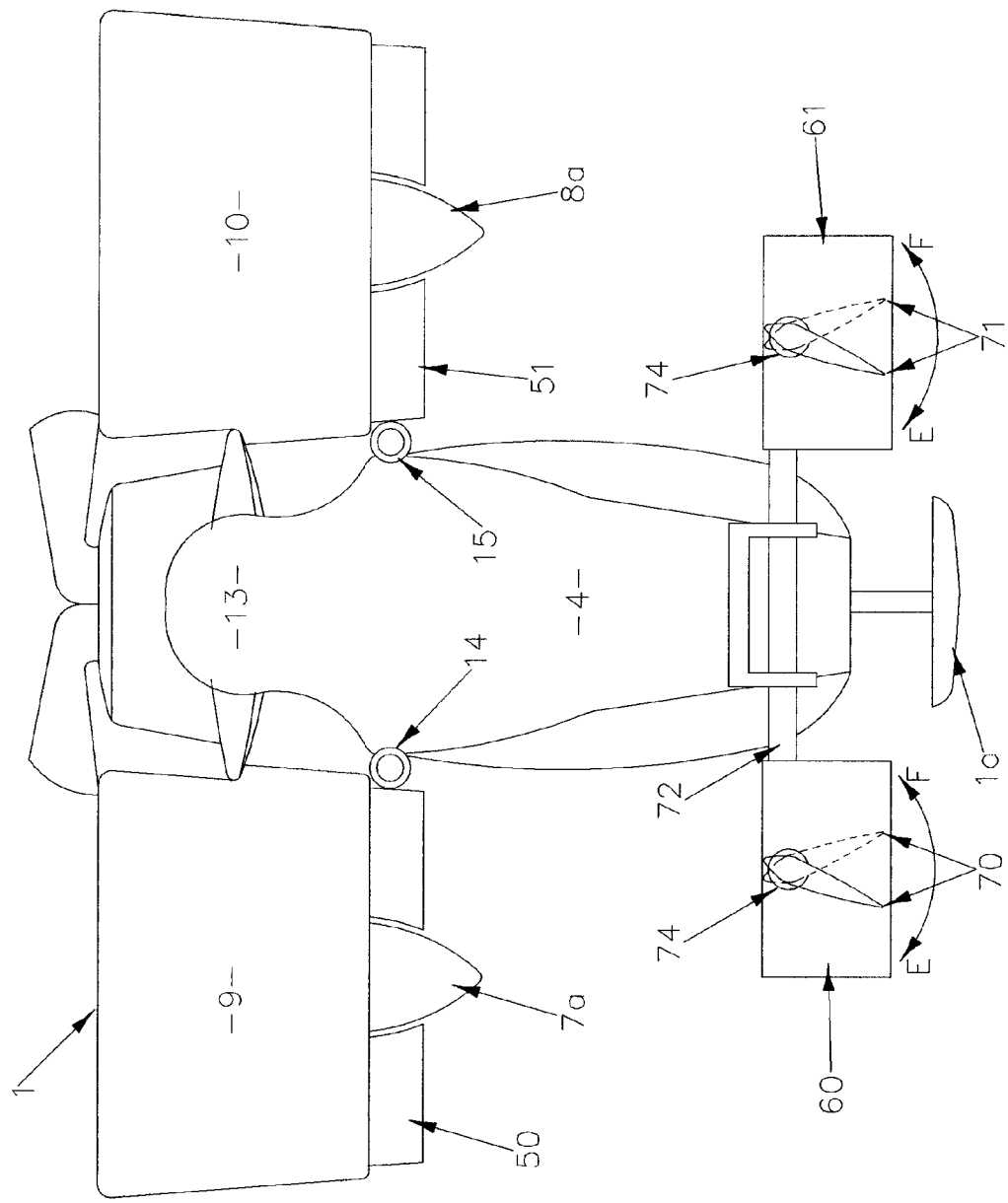
FIG. 1 is a diagrammatic front view of a device Martin Jetpack.

Referring to FIG. 12, a "virtual enclosure" training area is set up, either indoors or outdoors, using a number of sensors in the form of locator beacons 101 spaced around the perimeter of the training area. In FIG. 12, four locator beacons 101 are shown, but it will be appreciated that any number of beacons may be used, depending upon the size and shape of the virtual enclosure to be created. As used herein, the term "virtual enclosure" means a three-dimensional space defined by the overlapping ranges of the locator beacons used.

One suitable type of locator beacon 101 has been found to be the beacon made by Ubisense Ltd of UK and sold under the trademark UBISENSE. The UBISENSE beacon uses ultra wideband radio frequency technology in combination with a bidirectional control/telemetry channel to monitor the position of a tag relative to the sensors. The tag is secured to the article whose position is to be monitored (in this case the Martin Jetpack) and emits a series of ultra wideband radio pulses at time intervals controlled by the control radio channel. The pulses emitted from the tag are picked up by the sensors; each of the UBISENSE beacons is capable of locating a corresponding electronic tag to within approximately 125 mm in three-dimensions. Typically, the beacon software in each beacon locates the tag (which is located on the Martin Jetpack) approximately 10 times per second, and uses this information to update the on board computer on the Martin Jetpack, as described below.

Referring to FIGS. 1-11 of the drawings, a Martin Jetpack 1 includes a pair of ducted fans 2,3 which are supported and spaced apart by a central housing 4, which also supports an engine 6 and a fuel tank (not visible).

The ducted fans 2,3 are of known design and consist of a central multi-blade fan 7,8 mounted on, and rotatable with, a hub 7a,8a, inside a concentric cylindrical duct 9,10. The ducts 9,10 are rigidly mounted on the housing 4 by mounting brackets 4a (visible in FIG. 2 only) and are oriented such that in the "at rest" position shown in FIGS. 1 and 3, (i.e. when the device is resting on the ground) the axis of rotation of each fan is substantially vertical. The ends of the ducts 9,10 are depicted as open, but may in fact be covered by a protective grill or mesh.

Figure 6:
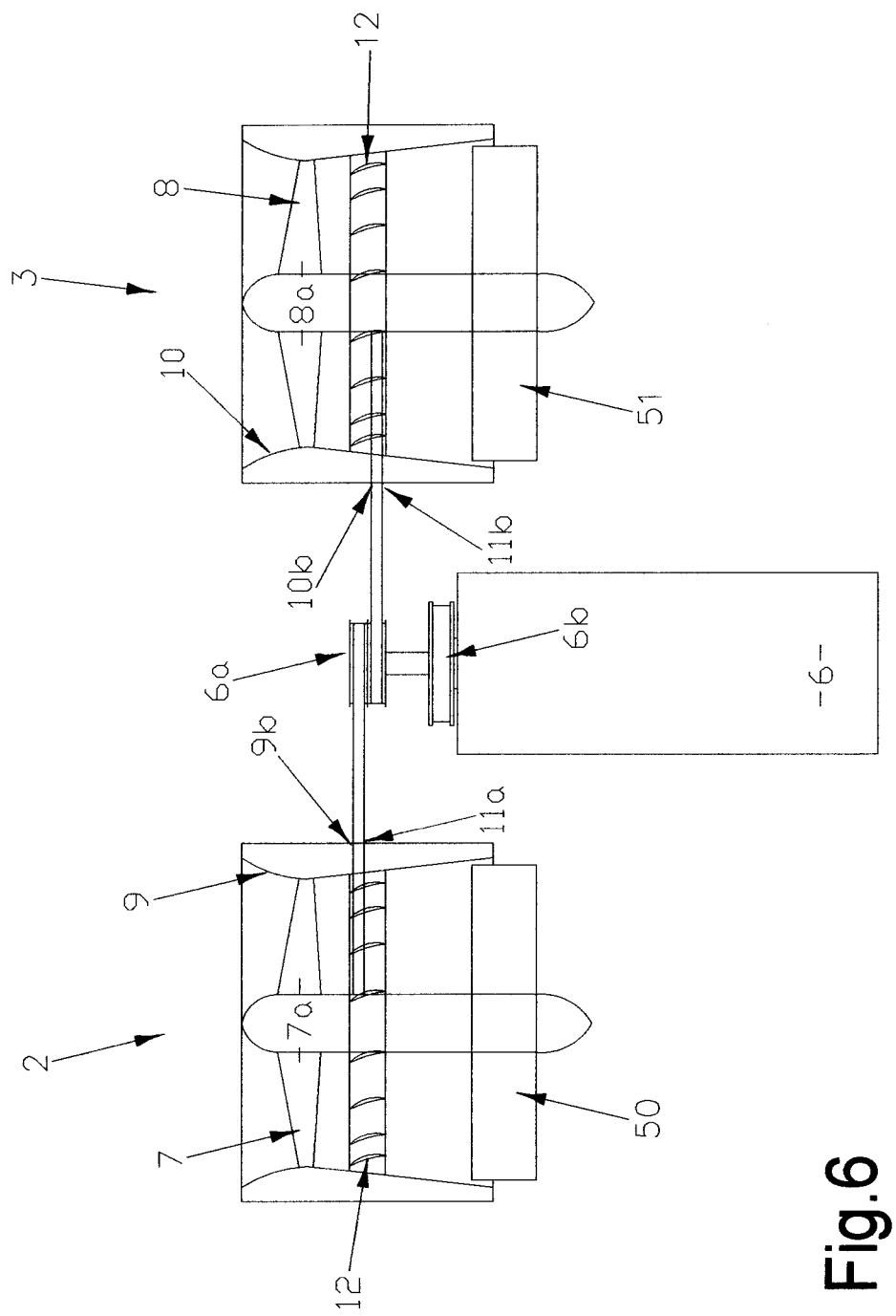
FIG. 6 is a diagram of the drive arrangement.

The fans 7,8 are driven from the engine 6 by a drive means in the form of a pair of toothed drive belts 11a,11b to the corresponding hub 7a,8a. The toothed belt drive is shown (diagrammatically) in FIGS. 4 and 6. As shown in FIG. 6, the engine 6 drives a drive pulley 6a through a flexible coupling 6b, to dampen torsional vibration from the engine 6. Two drive belts 11a,11b are engaged with the drive pulley 6a, one belt alongside the other.

The first drive belt 11a passes around the pulley 6a, through an aperture 9b in the duct 9 and around the hub 7a to drive the fan 7. The second drive belt 11b passes around the pulley 6a, through an aperture 10b in the duct 10, and around the hub 8a to drive the fan 8. In use, both fans 7,8 are rotated in the same direction.

Rotating both fans 7,8 in the same direction means that the fans can be driven directly from the engine and there is no need for a gearbox to alter the direction of drive. This saves a great deal of additional weight, and also eliminates a component which would need maintenance and be a possible source of failure. Rotating both fans in the same direction would impart torque to the device, making the device difficult or impossible to steer, were it not for the stators 12 which render the airflow leaving the fans 2,3 substantially linear.

The airflow from the bottom 9a,10a, of each duct 9,10 is made linear (i.e. substantially parallel to the longitudinal axis of the corresponding fan) by the use of a row of stators 12. The stators 12 are spaced, and extend radially around the inner circumference of each duct 9,10 below the corresponding fan 7,8. Each stator 12 is a 'spoke' which extends radially from the inner wall of the duct towards the hub.

Figure 8B:
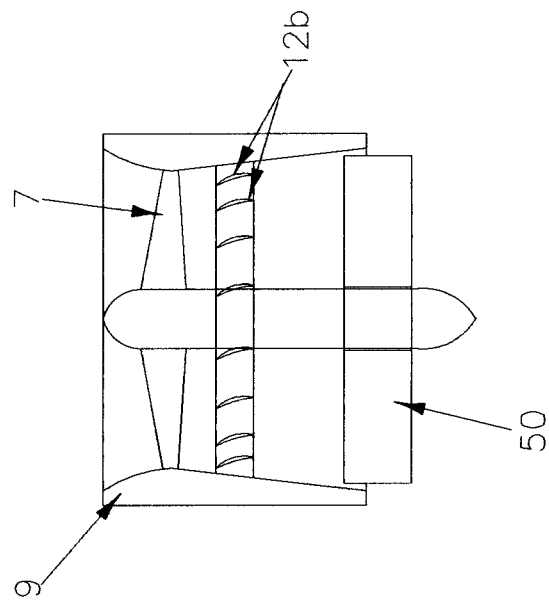
FIGS. 8a and b are diagrams of two different versions of stators.
Figure 8A:
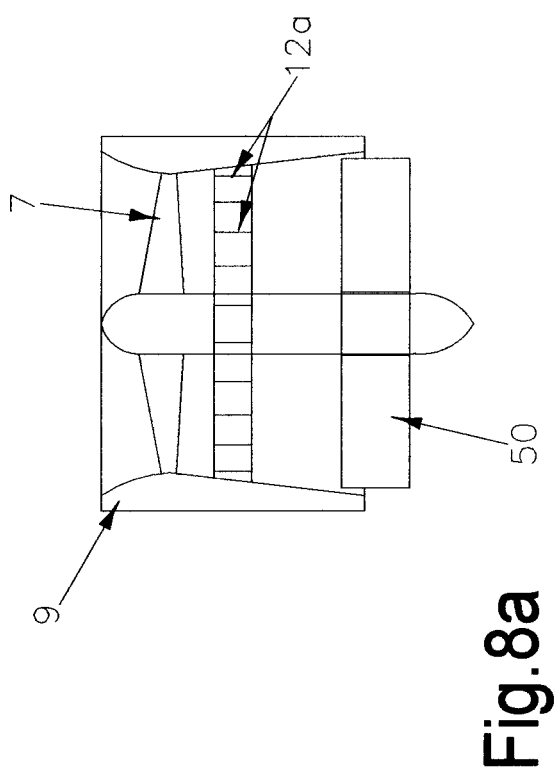

FIG. 8a shows the simplest arrangement of stators, in which each stator 12a is a flat parallel-sided plate, with the length of each plate extending radially from the inner wall of the duct towards the hub.

FIGS. 8b, 9 and 10 illustrate a more aerodynamically efficient design of stator 12b, in which each stator 12b is a curved aerofoil cross-section plate, one end of which is secured to the inner wall of the duct and the other end of which is secured to the hub. As shown in FIGS. 9 and 10, each stator 12b twists along its longitudinal axis from the hub to the duct. Stators of this design have a higher efficiency than the simple flat stators 12a, but are more expensive to produce and to fit.

The housing 4 is slightly wider than the shoulder width of the pilot, and approximately the same height as the pilot. In the "at rest" position shown in FIGS. 1 and 3 of the drawings, the device rests on a support 1a which may be of any suitable type.

Figure 2:
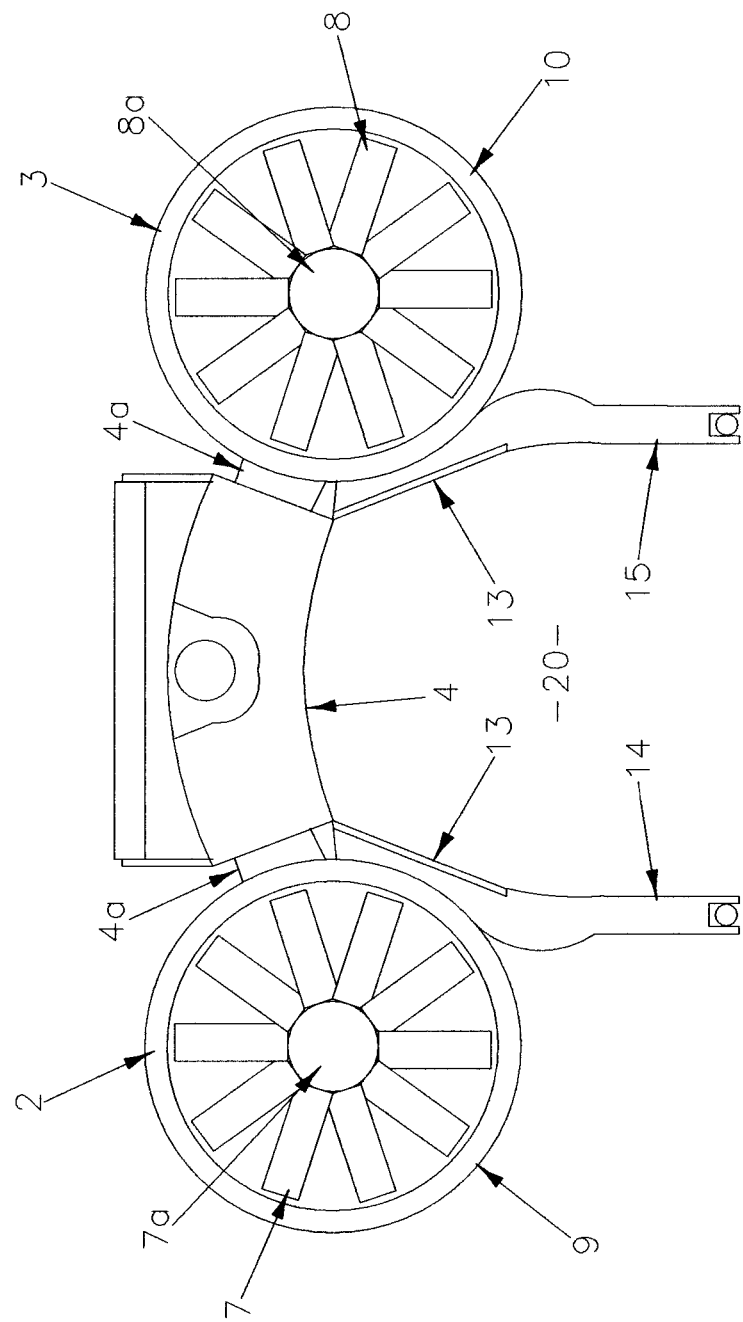
FIG. 2 is a plan view from above of the device of FIG. 1.

The housing 4 provides head shields 13 and armrests 14,15 (FIGS. 1 and 2).

The device is provided with controls for controlling yaw, pitch and roll; all of these controls can be operated by the pilot by means of control handles built into the armrests, as described below.

Figure 5:
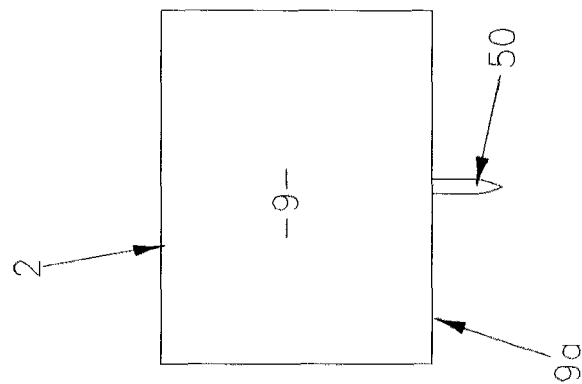
FIG. 5 is a side view of the fan of FIG. 4.
Figure 4:
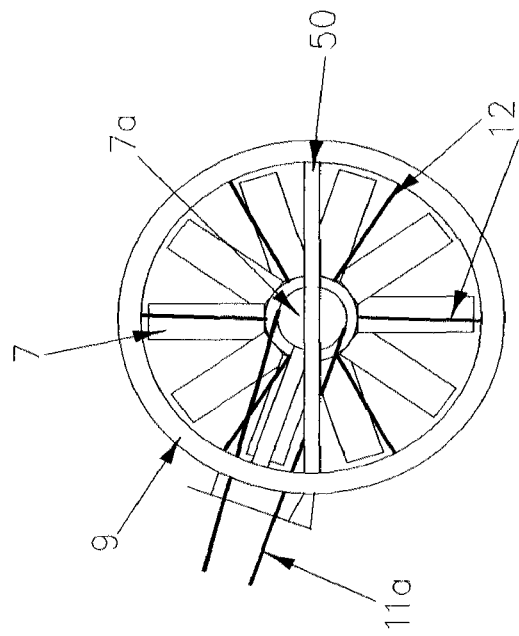
FIG. 4 is a view of one ducted fan from below.

Yaw is the angular rotation of the device about a vertical axis; this is controlled by a pair of control vanes 50,51, one vane being mounted diametrically across the exit end of each of the ducts 9,10, and arranged to pivot about an axis substantially perpendicular to the axis of rotation of the corresponding fan and hub. Each vane 50,51 has an aerofoil cross-section. Each vane projects partly below the lower edge of the corresponding duct, as shown in FIGS. 5 and 6, and is made in two sections, one section lying on each side of the lower part of the hub. The two sections of each vane may move together as a single unit.

Figure 7:
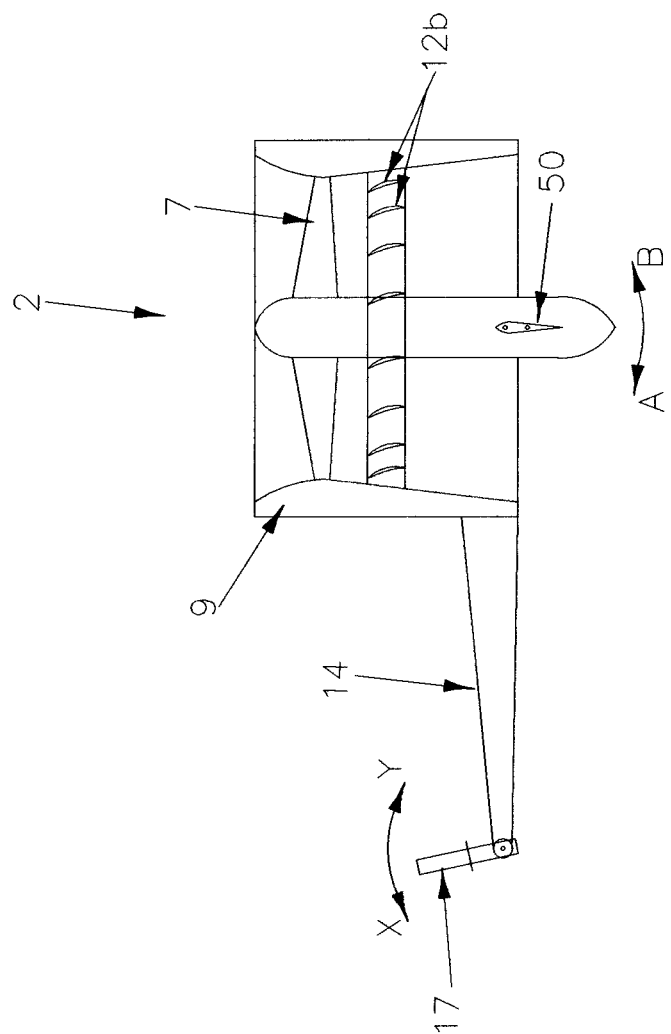
FIG. 7 is a diagram of part of the control system.

The control vanes 50,51 are moved by separate electric servomotors (not shown) controlled by a control lever 17 mounted on the corresponding armrest 14 (FIG. 7). The control system is always set so that the movement of one control vane 50 in one direction (e.g. the direction indicated by Arrow A in FIG. 7) produces an equal movement of the control vane 51 in the opposite direction (e.g. the direction indicated by Arrow B in FIG. 7):—this movement would yaw the device to the left; moving the vanes in the opposite direction would yaw the device to the right. The extent to which the control vanes are moved governs the degree of yaw.

Figure 3:
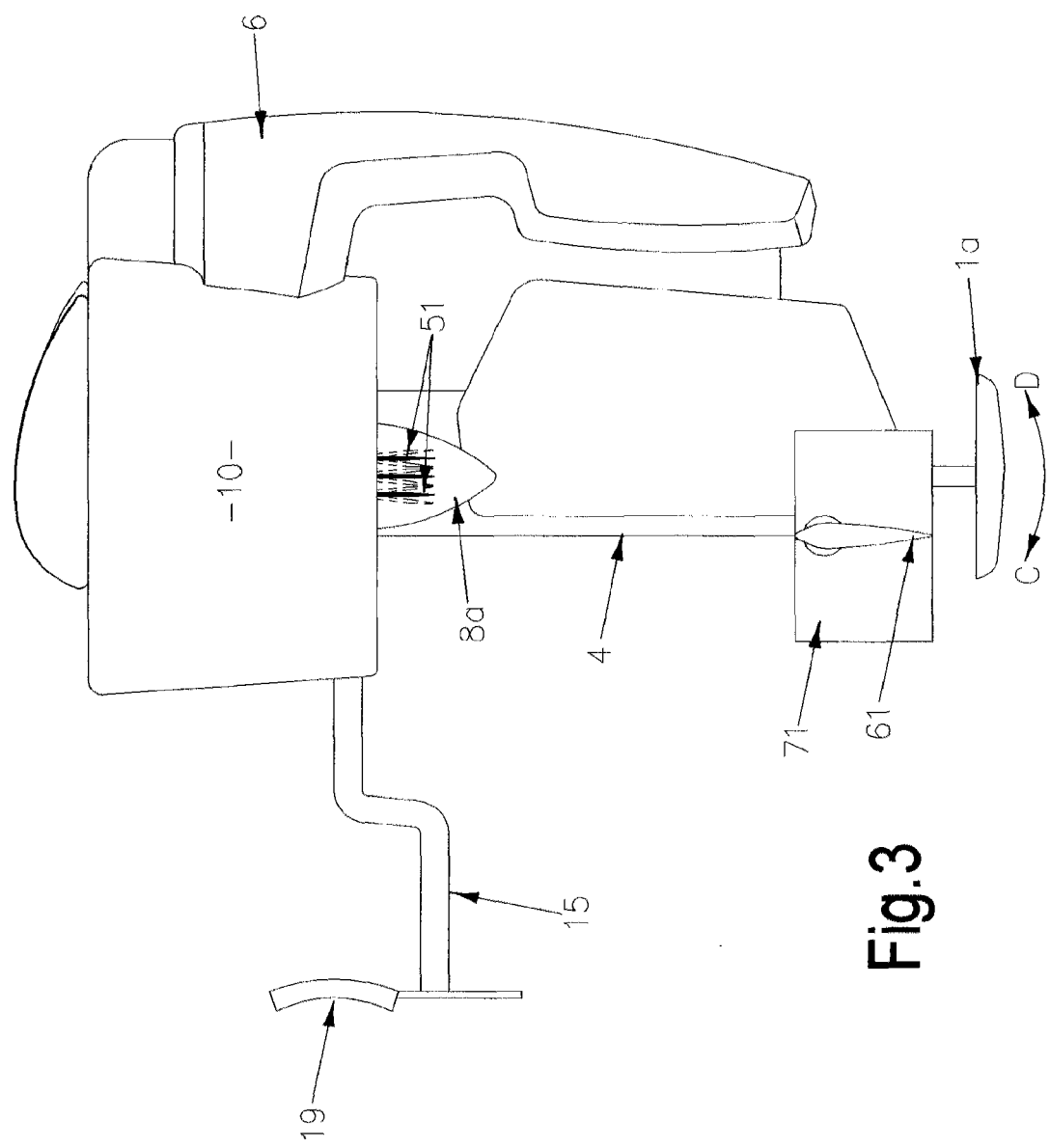
FIG. 3 is a side view of the device of FIG. 1.

FIGS. 1 and 7 show a single pair of control vanes 50, 51, but it also is possible to use multiple pairs of control vanes 50, 51, mounted in parallel as shown in FIG. 3. The multiple pairs of vanes are used in the same manner as the single pair of vanes.

Pitch and roll are governed by aerofoil-cross-section control surfaces 60/61 and 70/71 respectively. Pitch is the angular motion of the device in a vertical plane about a lateral axis; roll is the revolution of the device about a horizontal axis. From the point of view of the pilot of the device, yaw is swinging from side to side about a vertical axis, roll is leaning to one side or the other in a vertical plane, and pitch is leaning forwards or leaning backwards.

The control surfaces 60/61 and 70/71 are arranged as two sets of control surfaces in a cruciform configuration, with one set 60/70 on one side of the housing and the other set 61/71 on the other side of the housing. Both sets of control surfaces are supported by a support beam 72 which extends at right angles to the longitudinal axis of the device and is mounted across the lower portion of the housing, so that one set of control surfaces lies below the exit end of one duct, and the other set lies below the exit end of the other duct.

The control surfaces 60/61 which govern pitch are mounted on the support beam 72, with the longitudinal axis of the surface parallel to that of the support beam 72, and in the neutral position lie in a substantially vertical plane. The control surfaces 60/61 are moved by pivoting the support beam 72 in its bearings (not shown); this movement moves the lower end of the surfaces 60/61 in the directions indicated by the arrows C and D (FIG. 3). If the control surfaces 60/61 move in the direction of Arrow C, the air coming from the exit ends of the ducts 9,10 tends to pitch the device as shown in FIG. 3 anticlockwise. If the control surfaces 60/61 move in the direction of Arrow D, the device as shown in FIG. 3 is pitched clockwise.

Because of the cruciform arrangement of the control surfaces, surfaces 70/71 move with the surfaces 60/61, but in the pitching movement described in the preceding paragraph, the surfaces 70/71 remain at a constant angle to the airflow from the ducts and thus do not alter the orientation of the device.

The control surfaces 70/71 are each constructed as two equal parts, one on each side of the corresponding surface 60,61. The control surfaces 70/71 can pivot relative to the corresponding surfaces 60/61 as shown in broken lines in FIG. 1; this pivoting movement is controlled by a control rod which moves the control surfaces 70/71 on bearings 74 mounted on the surfaces 60/61. To roll the device to the left, (as viewed in FIG. 1) the control surfaces 70,71 are pivoted in the direction of Arrow E (FIG. 1); to roll the device to the right, the control surfaces 70/71 are pivoted in the direction of Arrow F.

The movements of the control surfaces 60/61, 70/71 are controlled by movements of the control handle 19, mounted on the armrest 15;

The armrest 14 also incorporates a twist grip throttle which is connected to the engine 6 and is used to control engine in known manner. The faster the engine speed, the greater the thrust of the fans 7,8, and the greater the lift and hence the height of the device from the ground.

Movements of all of the control surfaces 50/51, 60/61 and 70/71, as well as movement of the throttle, are by means of electronic actuators to operate any of a wide range of known hydraulic or electrical servos to act on the control surfaces/throttle. The controls/throttle may be manually controlled by the pilot, or may be remotely controlled via an interface with a microcomputer (the so-called "fly by wire" system). In the present invention, the device is primarily manually controlled, but with a safety override provided by computer control, so that if the device is at an unsafe attitude or speed, the override automatically cuts in. This is discussed in greater detail below.

In use, the pilot stands in the space 20 (FIG. 2) and is strapped to the device by means of a parachute type harness (not shown) which is mounted on the housing 4. Once strapped in, the pilot starts the engine 6 to rotate the fans 7,8 within the ducts 9,10 to give vertical lift to the device. The amount of lift is governed by the acceleration of the engine 6, which is controlled by the throttle. Pitch, roll and yaw are controlled as described above.

The Martin Jetpack also carries an on board computer (not visible) which is programmed to control each of the four controls (pitch/roll/yaw/throttle) within preset parameters.

Thus, the pilot operates the pitch, roll and yaw controls, and the throttle, as described above, and has full control of the Martin Jetpack unless any one or more of the height, or the speed, or the attitude of the device exceeds the preset parameters, in which case the computer control over-rides the manual control.

The Martin Jetpack carries a Ubisense tag, and this provides the position of the Jetpack relative to the sensors:—the Ubisense sensors detect the position of the tag and also its rate of change of position, to determine, respectively, the height and the speed of the device. For initial training purposes, the height is limited to 750 mm (measured as the distance between the ground and the lowest part of the bottom of the stand 1a), and the speed is limited to 15 km per hour. The throttle is controlled, (e.g. 50 times a second) to maintain the desired height. In the event that the pilot releases the joystick trigger or there is a systems failure or the zone 4 is reached as described below, the throttle automatically reverts to a default setting which slows the engine gradually for a slow landing.

The Martin Jetpack also is provided with an attitude sensor (not visible) which is connected to the on board computer. The attitude sensor is a commercially available attitude sensor (for example Rockwell Collins Micro INS) and measures pitch, roll, and heading with reference to Earth (i.e. yaw):—it incorporates three accelerometers to measure tilt in all three axes with reference to the force of gravity, three gyroscopes, to measure the rate of turn in any axis, and a magnetometer to measure magnetic heading.

The readings from the attitude sensor advise the on board computer of the pitch, roll, and yaw of the device, and these readings are compared with preset training parameters. Typically the limit of roll is set to 5°, the limit of pitch is set to 8° and the limit of yaw is set to 30° per second. There are two additional safety provisions built in:—in the case of malfunction or systems failure, the pitch, roll and yaw controls all are set to default to "hover" settings in which the device is stable and upright and hovering above the ground. In addition, the pitch, roll and yaw controls are all dual redundant, in that the machine can be controlled correctly with only one set of each pair of pitch, roll and yaw controls operational, although in normal flight both controls of each pair are used.

As a final safety precaution, an instructor walks behind a trainee pilot in the Martin Jetpack, with a full over-ride set of controls, in communication with the trainee pilot. The instructor can simply give advice to the trainee, but if necessary can take over control completely and can reposition or land the device.

As shown in FIG. 12, the virtual enclosure training area is divided into four zones. The zones are shown as rectangles, but can be any desired regular or irregular shape. The virtual enclosure extends upwards up to 3 m above the ground for basic training; it will be appreciated that this height restriction obviously would be increased for more advanced training.

Zone 1 is the inner zone and is the zone where training would normally take place. The trainee pilot aims to stay within zone 1; if the Martin Jetpack is detected as passing into zone 2 by the Ubisense sensors 101 spaced around the virtual enclosure, then a signal is sent to the on board computer to lower the speed and the height of the Martin Jetpack and to impose tighter limits on the roll, pitch and yaw. If the pilot moves into zone 3, then the speed, height, roll, pitch and yaw limits are further reduced, and if the Martin Jetpack enters zone 4, the speed and height are both reduced to zero and the roll, pitch, and yaw limits are further reduced, so that the Martin Jetpack is stabilised and slowed for a safe landing.

Table 1 below sets out the recommended limits for zones 1-4.

TABLE 1

| ZONE | Resultant Speed limit (km/hr) | Roll limit (deg) | Pitch limit (deg) | Max height (mm) | Max yaw (deg/sec) |
| --- | --- | --- | --- | --- | --- |
| 1 | 15 | 5 | 8 | 750 | 30 |
| 2 | 10 | 4 | 7 | 500 | 20 |
| 3 | 5 | 2 | 5 | 250 | 10 |
| 4 | 0 | 2 | 2 | 0 | 2 |

It will be appreciated that the sensors 101 may be replaced by sensors based on any wireless 3-D location system, e.g. GPS, RFID (radio-frequency identification), ultrasonics, radar, or UWD (ultra wideband) technology. Also, any suitable types of attitude sensor and electronic actuators may be used.

If the system is to be used for a ground vehicle, then obviously speed still needs to be controlled, but height does not need to be controlled, and the pitch, roll, and yaw controls are replaced by controls for the vehicle's direction and rate of turn in any direction; the sensors are selected accordingly:—for example, gyroscopes can be used to measure the rate of turn in any direction. The virtual enclosure training area is formed by a number of spaced sensors, as with a flying vehicle; the same types of sensors as used for flying vehicles may be used.

The invention claimed is:

1. A training system for use in combination with a manned independently controllable powered solo vehicle, the system including:
    a training area having boundaries defined by a plurality of spaced sensors and allowing for movement of the vehicle to different locations within said training area;
    a computer for being associated with said vehicle for communicating with, and receiving instructions from, each of said plurality of sensors;
    at least one electronic controller for controlling at least one of:
        speed and orientation of said vehicle if said vehicle is a ground vehicle; and
        speed, orientation and height of said vehicle if said vehicle is a flying vehicle;
    wherein when in said training area the speed and orientation when said vehicle is a ground vehicle and the speed, orientation and height when said vehicle is flying vehicle in use are controllable by a person manning the vehicle, unless the vehicle exceeds pre-set parameters of speed and/or orientation for the ground vehicle or of speed and/or orientation and/or height for the flying vehicle, in which case said at least one electronic controller under the control of said computer overrides the manned independent control of the vehicle such that the speed and/or orientation of the ground vehicle or the speed and/or orientation and/or height of the flying vehicle are controllable by said at least one electronic controller within said pre-set parameters.

2. The training system as claimed in claim 1, wherein in use one or more of said plurality of spaced sensors senses a position of the vehicle in the training area and communicates with said computer if said vehicle's position fails to comply with one or more pre-set parameters, such that said computer causes said at least one electronic controller to regulate at least the speed of said vehicle.

3. The training system as claimed in claim 1, wherein each of said plurality of sensors is adapted to sense both the position and the rate of change of position of said vehicle.

4. The training system as claimed in claim 2, wherein each of said plurality of sensors is adapted to sense both the position and the rate of change of position of said vehicle.

5. The training system as claimed in claim 4, wherein said training area provides at least two zones, and said pre-set parameters are different for different zones.

6. The training system as claimed in claim 1, wherein said training area provides at least two zones, and said pre-set parameters are different for different zones.

7. The training system as claimed in claim 6, wherein said at least two zones are arranged with an inner zone providing a preferred training area and the one or more outer zones providing safety areas.

8. The training system as claimed in claim 1, wherein said training area is indoors.

9. The training system as claimed in claim 1, wherein said training area is outdoors.

10. The training system as claimed in claim 1, wherein in use a program of said computer includes default settings designed to bring said vehicle to a safe position in an event of any malfunction or control error.

11. The training system as claimed in claim 1, wherein each sensor of said plurality of spaced sensors provides a wireless 3-D location system and is selected from the group consisting of: a GPS locator beacon, a radio-frequency identification sensor, an ultrasonics sensor, a radar beacon, and an ultra-wideband sensor.

12. The training system as claimed in claim 11, further including a tag secured to the vehicle in the training area, said tag being arranged in use to emit signals detectable by one or more of said plurality of spaced sensors.

13. The training system as claimed in claim 1, wherein said vehicle is a ground vehicle and said at least one electronic controller includes a gyroscope.

14. The training system as claimed in claim 1, wherein said vehicle is a flying vehicle and said at least one electronic controller includes an attitude sensor.

15. A training system for use in combination with a manned independently controllable powered solo flying vehicle, said system including:
   a training area having boundaries defined by a plurality of spaced sensors and allowing for movement of said vehicle to different locations within said training area;
   a computer for being associated with said vehicle for communicating with, and receiving instructions from, each of said plurality of sensors;
   at least one electronic controller for controlling at least one of the speed, orientation and height of the vehicle;
   wherein when in said training area, the speed, orientation and height of the vehicle in use are controllable by a person manning the vehicle, unless the vehicle exceeds pre-set parameters of speed and/or orientation and/or height, in which case said at least one electronic controller under the control of said computer overrides the manned independent control of the vehicle such that the speed and/or orientation and/or height of the vehicle is controlled by said at least one electronic controller within said pre-set parameters.

16. The training system as claimed in claim 15, wherein each of said plurality of spaced sensors is an ultra-wideband radio-frequency beacon and the vehicle is provided with a tag which in use emits a series of ultra-wideband radio pulses at predetermined time intervals, such that said pulses are detected by one or more of said plurality of spaced sensors; and
   wherein in use said tag and said sensors in combination provide information to said computer as to the position, height and speed of the vehicle.

17. The training system as claimed in claim 16, wherein said at least one electronic controller includes an attitude sensor capable of measuring pitch, roll and yaw.

18. The training system as claimed in claim 16, wherein said training area provides at least two zones and said pre-set parameters are different for different zones.

19. The training system as claimed in claim 15, wherein said training area provides at least two zones and said pre-set parameters are different for different zones.

20. The training system as claimed in claim 19, wherein said at least two zones are arranged with an inner zone providing the preferred training area and one or more outer zones providing safety areas.

21. The training system as claimed in claim 15, wherein in use a program of said computer includes default settings designed to bring said vehicle to a safe position in the event of any malfunction or control error.

22. The training system as claimed in claim 15, further including an independent set of controls for controlling the pitch, roll, yaw and throttle of said vehicle, said controls being capable of overriding both manual controls and controls of the computer and in use being controlled by an instructor from outside of said vehicle.

23. The training system as claimed in claim 15, wherein said vehicle is a personal flight device.

24. The training system as claimed in claim 16, wherein said vehicle is a personal flight device.

25. The training system as claimed in claim 20, wherein said vehicle is a personal flight device.

* * * * *